(12) United States Patent
Zhong et al.

(10) Patent No.: US 11,708,898 B2
(45) Date of Patent: Jul. 25, 2023

(54) GEAR SHIFTING MECHANISM, GEARBOX, POWERTRAIN, AND ELECTRIC VEHICLE

(71) Applicant: Huawei Digital Power Technologies Co., Ltd., Shenzhen (CN)

(72) Inventors: Hu Zhong, Shanghai (CN); Xueyu Mei, Shanghai (CN); Huan Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/710,637

(22) Filed: Mar. 31, 2022

(65) Prior Publication Data

US 2022/0221054 A1    Jul. 14, 2022

(30) Foreign Application Priority Data

Mar. 31, 2021    (CN) .......................... 202110349748.2

(51) Int. Cl.
| | |
|---|---|
| *F16H 63/30* | (2006.01) |
| *F16H 55/17* | (2006.01) |
| *F16H 57/023* | (2012.01) |
| *F16H 63/32* | (2006.01) |
| *F16D 23/06* | (2006.01) |
| *F16D 11/00* | (2006.01) |

(52) U.S. Cl.
CPC ......... *F16H 63/3043* (2013.01); *F16D 23/06* (2013.01); *F16H 55/17* (2013.01);
(Continued)

(58) Field of Classification Search
CPC .... F16H 63/3043; F16H 55/17; F16H 57/023; F16H 63/32; F16H 2055/178;
(Continued)

(56) References Cited

U.S. PATENT DOCUMENTS

| | | | | |
|---|---|---|---|---|
| 2,248,134 | A | * | 7/1941 | Snow ...................... F16D 23/06 192/81 C |
| 2,735,528 | A | * | 2/1956 | Dodge .................... F16D 11/10 192/114 R |

(Continued)

FOREIGN PATENT DOCUMENTS

| | | |
|---|---|---|
| CN | 201992007 U | 9/2011 |
| CN | 103511561 A | 1/2014 |

(Continued)

*Primary Examiner* — Jake Cook
(74) *Attorney, Agent, or Firm* — Leydig, Voit and Mayer, Ltd.

(57) ABSTRACT

This application provides a gear shifting mechanism, a gearbox, and a powertrain. The gear shifting mechanism includes a gear, a gear hub, a one-way clutch, and a sliding apparatus. The gear has a first convex wall and a second convex wall that are disposed around a shaft hole. A first toothed structure is disposed at an end of the first convex wall, and a diameter of the second convex wall is less than that of the first convex wall. The gear hub is sleeved on the second convex wall. The one-way clutch is disposed between the gear hub and the second convex wall. The sliding apparatus is sleeved on the gear hub, and the sliding apparatus is capable of sliding in a direction toward or away from the gear. The gear shifting mechanism can improve stability for transmitting a gear shifting power, thereby improving driving performance of an electric vehicle.

13 Claims, 9 Drawing Sheets

(52) U.S. Cl.
CPC ........... *F16H 57/023* (2013.01); *F16H 63/32* (2013.01); *F16D 2011/002* (2013.01); *F16H 2055/178* (2013.01); *F16H 2063/321* (2013.01)

(58) Field of Classification Search
CPC ............... F16H 2063/321; F16D 23/06; F16D 2011/006; F16D 11/04; F16D 11/10
See application file for complete search history.

(56) References Cited

U.S. PATENT DOCUMENTS

| | | | |
|---|---|---|---|
| 7,101,301 B2 * | 9/2006 | Haka | B60K 17/346 475/311 |
| 2002/0079190 A1 | 6/2002 | Burger | |
| 2004/0123690 A1 | 7/2004 | Maisch et al. | |

FOREIGN PATENT DOCUMENTS

| | | |
|---|---|---|
| CN | 205678085 U | 11/2016 |
| CN | 108973630 A | 12/2018 |
| CN | 109654219 A | 4/2019 |
| CN | 109826929 A | 5/2019 |
| CN | 109854688 A | 6/2019 |
| CN | 110513449 A | 11/2019 |
| CN | 110513450 A | 11/2019 |
| CN | 112984106 A | 6/2021 |
| DE | 102017119327 B3 | 9/2018 |
| EP | 4080076 A1 * | 10/2022 |
| JP | H02266127 A | 10/1990 |

* cited by examiner

GEAR SHIFTING MECHANISM, GEARBOX, POWERTRAIN, AND ELECTRIC VEHICLE

CROSS-REFERENCE TO RELATED APPLICATIONS

This application claims priority to Chinese Patent Application No. 202110349748.2, filed on Mar. 31, 2021, which is hereby incorporated by reference in its entirety.

TECHNICAL FIELD

Embodiments of the present invention relate to the field of electric vehicle technologies, and in particular, to a gear shifting mechanism, a gearbox, a powertrain, and an electric vehicle.

BACKGROUND

An electric vehicle is driven by a motor. A power output by the motor is decelerated and torqued by a gearbox, and then transmitted to a wheel through an axle shaft (also referred to as a drive shaft) connected to the gearbox in a transmission manner, to drive the electric vehicle to travel.

A single-speed gearbox can search for an optimal speed ratio only within a limited vehicle speed range (for example, less than 150 km/h) to achieve a balance between costs and efficiency. However, a high efficiency area of the motor is concentrated at medium and low rotational speeds. Therefore, an operating point of the motor cannot be adjusted by using a fixed speed ratio of the single-speed gearbox. In addition, when the single-speed gearbox is used, and a higher speed is reached, the motor enters a constant power area at a high rotational speed due to characteristics of the motor, and an output torque of the motor decreases sharply. This causes power shortage of the electric vehicle at the high rotational speed. Therefore, a current two-speed gearbox is a major development trend in the electric vehicle field in the future. The two-speed gearbox is capable of changing a speed ratio to adjust an operating point of a motor, so as to increase an output torque of the motor at a high rotational speed, and also improve efficiency.

A gear shifting process of the two-speed gearbox may be implemented by using a gear shifting mechanism. Stability of power transmission of the gear shifting mechanism in the gear shifting process is an important factor that affects driving stability of an electric vehicle.

SUMMARY

This application provides a gear shifting mechanism, a gearbox, a powertrain, and an electric vehicle, to improve stability of power transmission of a gear shifting mechanism in a gear shifting process, so as to improve driving performance of an electric vehicle.

According to a first aspect, this application provides a gear shifting mechanism. The gear shifting mechanism includes a gear, a gear hub, a one-way clutch, and a sliding apparatus. The gear includes a body. A first convex wall and a second convex wall are disposed on an end face of the body. The first convex wall is disposed around a shaft hole of the body. A first toothed structure is disposed at an end, of the first convex wall, that is away from the body. The second convex wall and the first convex wall are disposed on a same side of the body. The second convex wall is disposed around the shaft hole of the body. A diameter of the second convex wall is less than that of the first convex wall. The gear hub is sleeved on the second convex wall. The one-way clutch is disposed between the gear hub and the second convex wall. An inner ring of the one-way clutch is connected to the second convex wall. An outer ring of the one-way clutch is connected to the gear hub.

When the sliding apparatus is specifically disposed, the sliding apparatus may be radially fixed to the gear hub, and the sliding apparatus is capable of sliding on a surface of the gear hub in a direction toward or away from the gear. In a possible implementation of this application, the sliding apparatus may include a supporting frame, a rolling component, and a sliding sleeve. The supporting frame is sleeved on the gear hub, and the supporting frame is radially fixed to the gear hub. In addition, a second toothed structure is disposed at an end, of the supporting frame, that faces the first convex wall, and the second toothed structure may be meshed with the first toothed structure of the first convex wall. The supporting frame is further disposed with a mounting slot. The rolling component is mounted in the mounting slot, and the rolling component is in contact with the surface of the gear hub. The sliding sleeve is sleeved on the supporting frame. The rolling component is confined between the sliding sleeve and the gear hub. The sliding sleeve is capable of driving the supporting frame and the rolling component to slide on the surface of the gear hub in a direction toward or away from the gear.

In a possible implementation of this application, when the second toothed structure is meshed with the first toothed structure, the gear and a rotary shaft rotate synchronously. In this application, the second toothed structure may be stably meshed with the first toothed structure, to avoid power loss due to disengagement of the one-way clutch resulting from power fluctuation, and ensure stable power transmission between the gear and the gear hub. In addition, when the second toothed structure is detached from the first toothed structure, in a case, the one-way clutch may still lock the second toothed structure and the first toothed structure, so that the second toothed structure and the first toothed structure can rotate synchronously. In another case, the one-way clutch may be in an open state, and the one-way clutch does not hinder relative movement between the second toothed structure and the first toothed structure, so that the second toothed structure and the first toothed structure can rotate differentially.

In a possible implementation of this application, the gear shifting mechanism may further include the rotary shaft, and the rotary shaft penetrates the shaft hole of the body. In addition, the gear hub may be fixedly connected to the rotary shaft. In this way, power transmission between the gear and the gear hub can be converted into power transmission between the gear and the rotary shaft, so that the gear shifting mechanism implements power transmission between the gear shifting mechanism and a wheel of an electric vehicle by using the rotary shaft.

A bearing may be further disposed in the shaft hole of the body of the gear, so that the gear can be sleeved on the rotary shaft by using the bearing, and the gear and the rotary shaft can rotate differentially.

In this application, teeth of the second toothed structure of the supporting frame and teeth of the first toothed structure of the first convex wall may be both arranged in trapezoidal structures, so that the second toothed structure can be meshed with the first toothed structure.

In a possible implementation of this application, a locking structure of the supporting frame may be designed, so that the second toothed structure of the supporting frame can be stably meshed with the first toothed structure of the first convex wall. During specific implementation, a first stepped surface, a second stepped surface, and an arc connection surface used to connect the first stepped surface and the second stepped surface may be disposed on a surface, of the gear hub, that is used to fit the sliding apparatus. The first stepped surface is located on a side, of the second stepped surface, that is away from the rotary shaft, so that a step is formed between the first stepped surface and the second stepped surface. In addition, a diameter of the rolling component is greater than a wall thickness of the supporting frame. In this way, when the second toothed structure is meshed with the first toothed structure, the rolling component is tangent to the second stepped surface and an inner surface of the sliding sleeve. In this case, movement of the rolling component in a direction away from the first toothed structure is blocked by the step and the sliding sleeve. In addition, because the rolling component is mounted on the supporting frame, a location of the supporting frame is locked, and the second toothed structure of the supporting frame is stably meshed with the first toothed structure of the first convex wall, thereby implementing stable power transmission of the gear shifting mechanism.

It can be understood that a specific manner of disposing the rolling component is not limited in this application. For example, the rolling component may be a pin roller. In this case, the mounting slot on the supporting frame may be provided as a rectangular slot, so that the rolling component can be confined in the rectangular slot.

In a possible implementation of this application, a should is further disposed at an end, of the supporting frame, that is away from the first convex wall, and the sliding sleeve is disposed on a side, of the should, that faces the gear. In this way, when the sliding sleeve slides in a direction away from the first convex wall, the sliding sleeve can abut against the should, to push the supporting frame to slide.

In addition, an arc surface is further disposed on the inner surface of the sliding sleeve. When the sliding sleeve slides in the direction away from the first convex wall, the rolling component can be tangent to the arc surface of the sliding sleeve, so that the rolling component can slide along with the supporting frame, until the second toothed structure of the supporting frame is detached from the first toothed structure of the first convex wall. In this state, the rolling component rolls from the second stepped surface to the first stepped surface, and the rolling component is tangent to the first stepped surface and the arc surface of the sliding sleeve, so that the rolling component is confined between the first stepped surface and the sliding sleeve.

In a possible implementation of this application, sliding of the sliding sleeve may be implemented by using a shifting fork. During specific implementation, a groove may be disposed on a surface, of the sliding sleeve, that is away from the gear hub. The shifting fork may snap into the groove, so that the shifting fork can drive the sliding sleeve to slide on the surface of the gear hub in a direction toward or away from the gear.

According to a second aspect, this application provides a gearbox. The gearbox may include the gear shifting mechanism in the first aspect. A gear of the gear shifting mechanism may be meshed with a gear on another rotary shaft in the gearbox, to implement power transmission between the two gears. Stability of power transmission of the gear shifting mechanism provided in this application is relatively high. Therefore, stability of power transmission of the gearbox using the gear shifting mechanism is improved.

According to a third aspect, this application provides a powertrain. The powertrain includes a motor and a gearbox. A power output by the motor may be transmitted to the gearbox through a gear shifting mechanism. Power transmission of the gearbox is relatively stable. Therefore, stability of power transmission between the motor and the gearbox can be improved.

According to a fourth aspect, this application further provides an electric vehicle. The electric vehicle includes the powertrain in the third aspect. In a gear shifting process, stability of power transmission of the electric vehicle is relatively high, so that the electric vehicle can travel smoothly. This helps improve driving experience of a user.

Figure 1:
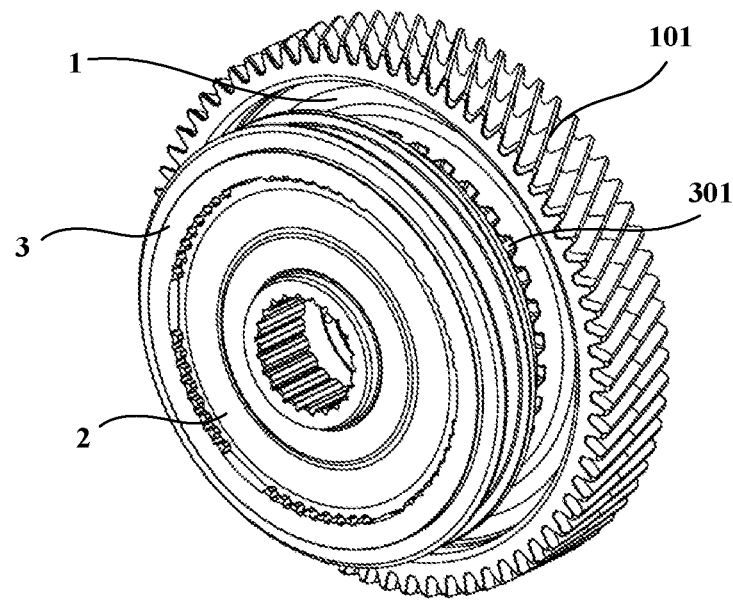
FIG. 1 is a schematic diagram of a structure of a gear shifting mechanism according to an embodiment of this application.

The following briefly describes structure illustrated in certain of FIGS. 1-12:

1: gear; 101: gear face; 102: body; 1021: shaft hole; 103: first convex wall; 1031: first toothed structure;

104: second convex wall; 2: gear hub; 201: first stepped surface; 202: second stepped surface; 203: arc connection surface;

3: sliding apparatus; 301: second toothed structure; 302: groove; 303: supporting frame; 3031: mounting slot;

3032: should; 304: rolling component; 305: sliding sleeve; 3051: arc surface; 4: rotary shaft; 5: bearing; 6: one-way clutch; and 7: shifting fork.

DESCRIPTION OF EMBODIMENTS

To make objectives, technical solutions, and advantages of this application clearer, the following further describes this application in detail with reference to the accompanying drawings. It should be noted that in the description of this application, "at least one" means one or more, and "a plurality of" means two or more. In view of this, in the embodiments of the present invention, "a plurality of" may also be understood as "at least two". The term "and/or" describes an association relationship between associated objects and indicates that three relationships may exist. For example, A and/or B may indicate the following three cases: Only A exists, both A and B exist, and only B exists. In addition, the character "/" generally indicates an "or" relationship between the associated objects, unless otherwise specified. In addition, it should be understood that in the description of this application, the terms such as "first" and "second" are merely used for distinguishing and description, but should not be understood as indicating or implying relative importance, or should not be understood as indicating or implying a sequence.

Reference to "an embodiment", "some embodiments", or the like described in this specification indicates that one or more embodiments of this application include a specific feature, structure, or characteristic described with reference to the embodiment. Therefore, in this specification, statements, such as "in an embodiment", "in some embodiments", "in some other embodiments", and "in other embodiments", that appear at different places do not necessarily mean reference to a same embodiment, instead, they mean "one or more but not all of the embodiments", unless otherwise specifically emphasized. The terms "include", "comprise", "have", and their variants all mean "include but are not limited to", unless otherwise specifically emphasized.

In recent years, electric vehicles develop rapidly. The electric vehicles use electric power as a power source. A fuel engine is replaced with a motor. This can not only achieve zero emission, low noise, and zero pollution, but also greatly save diminishing oil energy. With increasing maturity and development of power battery technologies for the electric vehicles, the electric vehicles inevitably become a main development trend of the automobile industry in the future.

As a core of an electric vehicle, a powertrain may usually include apparatuses such as a power supply, a motor, a motor controller, and a gearbox. A power output by the motor is decelerated and torqued by the gearbox, and then transmitted to a wheel through a drive shaft, to drive the electric vehicle to travel.

Currently, an electric vehicle usually uses a two-speed gearbox, to change a speed ratio to adjust an operating point of a motor, so as to increase an output torque at a high rotational speed, and also improve efficiency. The two-speed gearbox may be usually disposed with a gear shifting mechanism to perform gear shifting, and a function of the gear shifting mechanism is implemented mainly based on a change of a transmission relationship between components. However, a gearbox usually uses a synchronizer for gear shifting. In a gear shifting process of the gearbox, interruption of power transmission of the gear shifting mechanism affects driving stability of the electric vehicle.

A gear shifting mechanism provided in this application is intended to resolve the foregoing problem, to avoid power interruption of the gear shifting mechanism in a gear shifting process, so as to improve stability of power transmission of the gear shifting mechanism. The gear shifting mechanism is used in a gear shifting process of a gearbox, and can effectively avoid power interruption in the gear shifting process of the gearbox, so as to improve driving stability of an electric vehicle having the gearbox.

First, refer to FIG. 1. FIG. 1 is a schematic diagram of a structure of a gear shifting mechanism according to an embodiment of this application. The gear shifting mechanism may include a gear 1, a gear hub 2, and a sliding apparatus 3. A gear face 101 of the gear 1 may be used to be meshed with another gear. For example, the gear face 101 of the gear 1 may be meshed with another gear in a gearbox, to implement power transmission between the gear shifting mechanism and the another gear.

Figure 2:
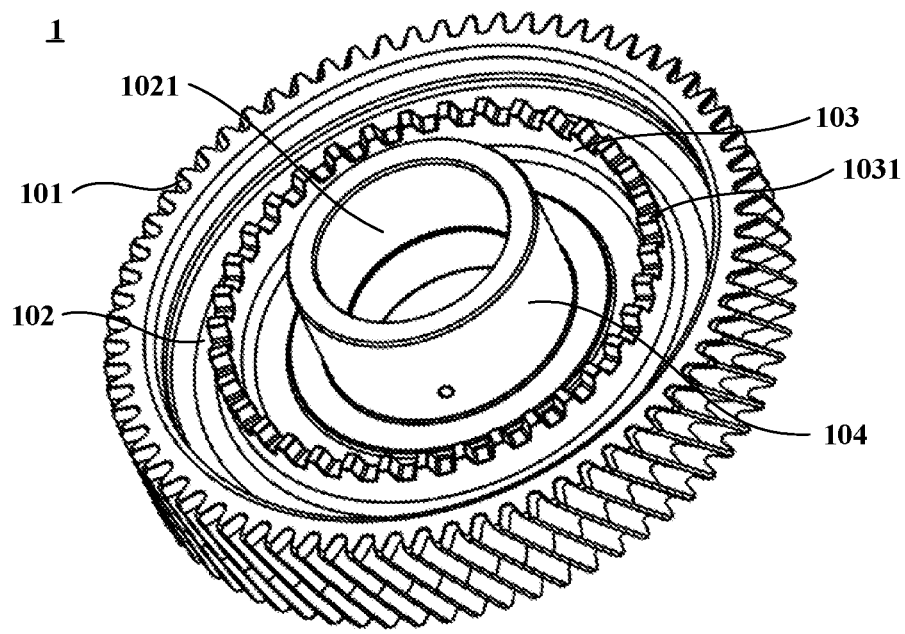
FIG. 2 is a schematic diagram of a structure of a gear according to an embodiment of this application.

FIG. 2 is a schematic diagram of a structure of the gear 1 according to an embodiment of this application. In this application, the gear 1 includes a body 102, and the gear face 101 is disposed on an outer ring of the body 102. A first convex wall 103 is disposed on an end face of the body 102, and the first convex wall 103 is disposed around a shaft hole 1021 of the body 102. In the embodiment shown in FIG. 2, the first convex wall 103 may be disposed in an annular structure, and a diameter of the first convex wall 103 is less than an inner diameter of the gear face 101 of the gear 1. In addition, the first convex wall 103 may be further disposed coaxially with the body 102 of the gear 1, so that a structure of the gear 1 is relatively compact.

A first toothed structure 1031 may be disposed at an end, of the first convex wall 103, that is away from the body 102. The first toothed structure 1031 has a plurality of teeth. The plurality of teeth may be evenly distributed in a direction around the first convex wall 103, but this does not constitute a limitation.

It can be understood that, in some possible embodiments of this application, the first convex wall 103 may alternatively include a plurality of arc protrusions with the first toothed structure 1031, to effectively reduce a weight of the gear 1. In addition, in this embodiment, a specific manner of disposing the first convex wall 103 is similar to that of disposing the first convex wall 103 in the annular structure. Details are not described herein again.

Still refer to FIG. 2. A second convex wall 104 may be further disposed on the end face of the body 102 of the gear 1. The second convex wall 104 may be disposed in an annular structure around the shaft hole 1021 of the gear 1. The second convex wall 104 and the first convex wall 103 are disposed on a same side of the body 102. The second convex wall 104 is disposed coaxially with the first convex wall 103, and a diameter of the second convex wall 104 is less than that of the first convex wall 103.

Refer to both FIG. 1 and FIG. 2. The gear hub 2 described in the foregoing embodiment may be sleeved on the second convex wall 104, the sliding apparatus 3 is sleeved on the gear hub 2, and a second toothed structure 301 is disposed at an end of a side, of the sliding apparatus 3, that faces the first convex wall 103. The second toothed structure 301 may be meshed with the first toothed structure 1031.

Figure 3:
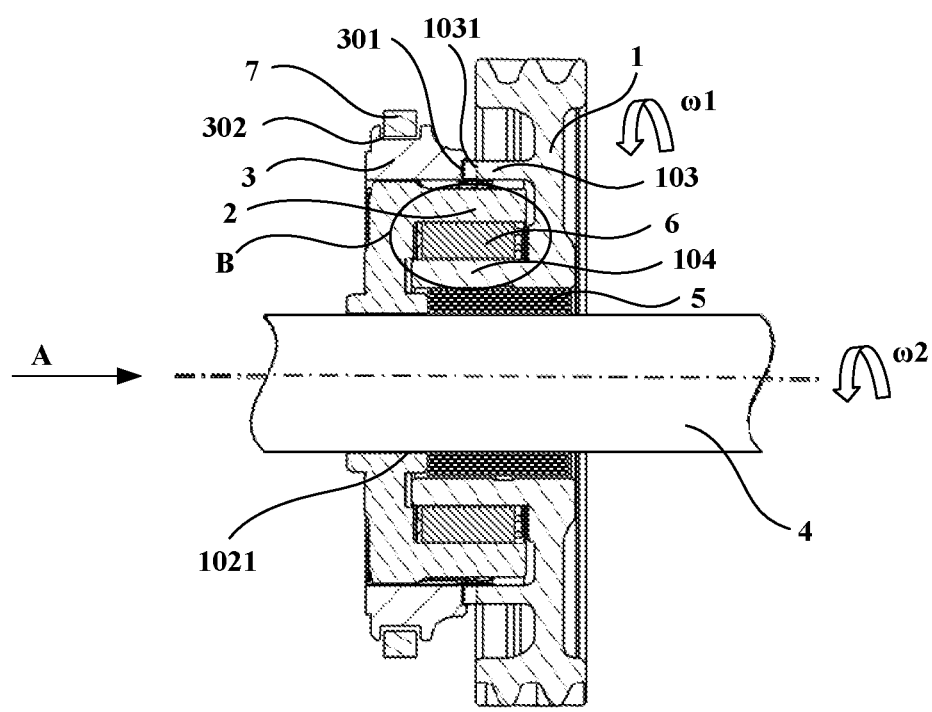
FIG. 3 is a cross-sectional view of a gear shifting mechanism according to an embodiment of this application.

For ease of understanding a connection relationship between the gear hub 2, the sliding apparatus 3, and the gear 1, refer to FIG. 3. FIG. 3 is a cross-sectional view of the gear shifting mechanism according to an embodiment of this application. In this embodiment, the gear shifting mechanism may further include a rotary shaft 4. The rotary shaft 4 penetrates the shaft hole 1021 of the body 102 of the gear 1. In addition, a bearing 5 may be further disposed in the shaft hole 1021 of the body 102 of the gear 1, so that the gear 1 is sleeved on the rotary shaft 4 by using the bearing 5, and the gear 1 and the rotary shaft 4 can rotate independently at different rotational speeds. In some possible embodiments of this application, the bearing 5 may be, but is not limited to, a deep groove ball bearing, a needle roller bearing, or the like.

It can be learned from the embodiment shown in FIG. 1 that, in this application, the gear hub 2 and the sliding apparatus 3 may also be disposed in annular structures. Still refer to FIG. 3. The gear hub 2 is sleeved on the second convex wall 104 of the gear 1, and an end of the gear hub 2 is further inserted between the first convex wall 103 and the second convex wall 104.

In addition, the gear hub 2 may be further sleeved on the rotary shaft 4, so that the gear hub 2 and the gear 1 can be disposed coaxially. In this application, the gear hub 2 and the rotary shaft 4 may be fixedly connected. For example, the gear hub 2 and the rotary shaft 4 may be connected by using a spline, a flat key, or the like, or may be connected through soldering or in an interference fit manner, so that the gear hub 2 can rotate along with the rotary shaft 4.

Still refer to FIG. 3. A one-way clutch 6 is further disposed between the gear hub 2 and the second convex wall 104, and the one-way clutch 6 is sleeved on the second convex wall 104. In this application, a specific form of disposing the one-way clutch 6 is not limited. For example, the one-way clutch 6 may be a roller one-way clutch or a wedge one-way clutch.

In a possible embodiment of this application, the one-way clutch 6 may include an inner ring, an outer ring, and a locking structure disposed between the inner ring and the outer ring. The locking structure may be configured to lock relative rotation between the outer ring and the inner ring in a specific direction, so that the outer ring and the inner ring rotate synchronously; and skip locking relative rotation in another direction, so that the outer ring and the inner ring rotate relative to each other.

Still refer to FIG. 3. In this application, the inner ring of the one-way clutch 6 may be connected to the second convex wall 104, and the outer ring may be connected to the gear hub 2. In this way, when the rotary shaft 4 tends to rotate relative to the gear 1 in a first direction, the one-way clutch 6 may lock relative movement between the gear hub 2 and the second convex wall 104, to hinder relative movement between the gear hub 2 and the second convex wall 104, so that the rotary shaft 4 and the gear 1 rotate synchronously. When the rotary shaft 4 rotates relative to the gear 1 in the first direction or a second direction, where the second direction is opposite to the first direction, the one-way clutch 6 does not hinder relative movement between the gear hub 2 and the second convex wall 104. In this case, the rotary shaft 4 and the gear 1 can rotate at different rotational speeds, thereby implementing differential rotation of the rotary shaft 4 and the gear 1.

It can be learned from the descriptions of the foregoing embodiment that the sliding apparatus 3 may be sleeved on the gear hub 2. In addition, the sliding apparatus 3 may further slide on a surface of the gear hub 2 along a side that faces or is away from the gear 1, so that the second toothed structure 301 of the sliding apparatus 3 can be meshed with the first toothed structure 1031 of the first convex wall 103, or the second toothed structure 301 and the first toothed structure 1031 that are meshed are detached from each other.

To implement sliding of the sliding apparatus 3 on the surface of the gear hub 2, in a possible embodiment of this application, the gear shifting mechanism may further include a shifting fork 7. A groove 302 may be disposed on a surface, of the sliding apparatus 3, that is away from the gear hub 2. The shifting fork 7 may snap into the groove 302, to implement connection between the shifting fork 7 and the sliding apparatus 3. In addition, the shifting fork 7 may be further connected to a gear shifting controller. In this way, with the gear shifting controller, the shifting fork can drive the sliding apparatus 3 to slide on the surface of the gear hub 2, to control a meshed or detached state of the second toothed structure 301 of the sliding apparatus 3 and the first toothed structure 1031 of the first convex wall 103 of the gear 1.

It can be understood that the foregoing embodiment provides only one possible connection manner of the shifting fork 7 and the sliding apparatus 3. In some other embodiments of this application, the shifting fork 7 and the sliding apparatus 3 are connected in another possible manner. In addition, the sliding of the sliding apparatus 3 on the surface of the gear hub 2 may be alternatively implemented by disposing another possible axial sliding system.

After the structure of the gear shifting mechanism provided in the foregoing embodiment of this application is understood, the following describes in detail an operating status and a gear shifting process of the gear shifting mechanism with reference to the accompanying drawings.

First, refer to FIG. 3. In an embodiment shown in FIG. 3, the second toothed structure 301 of the sliding apparatus 3 and the first toothed structure 1031 of the first convex wall 103 of the gear 1 are in a detached state.

Figure 4:
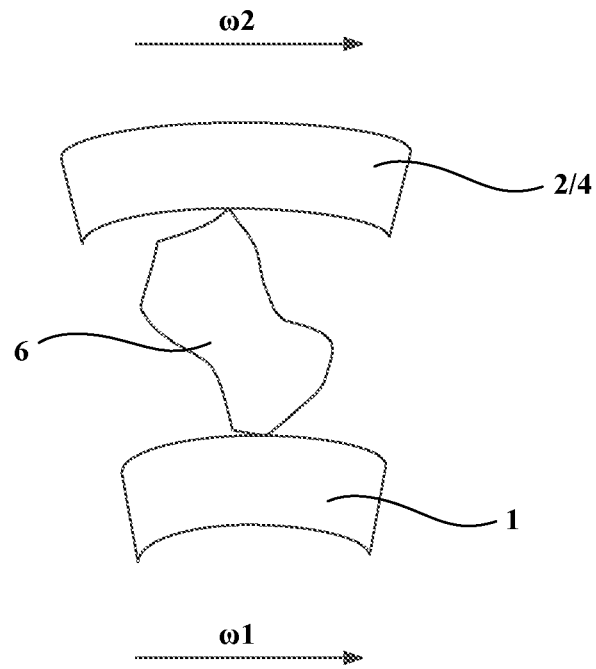
FIG. 4 is a schematic diagram of differential rotation of a gear and a rotary shaft according to an embodiment of this application.

FIG. 4 shows differential rotation of the gear 1 and the rotary shaft 4 in a view along a direction A in FIG. 3. A direction of the differential rotation of the gear 1 and the rotary shaft 4 may be a clockwise direction or a counter-clockwise direction. In an embodiment shown in FIG. 4, the differential rotation of the gear 1 and the rotary shaft 4 is described by using an example in which both the gear 1 and the rotary shaft 4 rotate clockwise. A rotational speed of the gear 1 may be denoted as $\omega 1$, and a rotational speed of the rotary shaft 4 may be denoted as $\omega 2$. Because the gear hub 2 is fixedly connected to the rotary shaft 4, the gear hub 2 may rotate synchronously with the rotary shaft 4. In this case, a rotational speed of the gear hub 2 is also $\omega 2$. In this embodiment of this application, the rotational speed $\omega 1$ of the gear 1 may be greater than the rotational speed $\omega 2$ of the rotary shaft 4. In this state, the one-way clutch 6 does not lock relative rotation between the second convex wall 104 and the gear hub 2, and therefore does not lock relative rotation between the gear 1 and the rotary shaft 4, to implement the differential rotation of the gear 1 and the rotary shaft 4. In this case, the gear 1 and the rotary shaft 4 can rotate independently. In this application, a differential rotation state of the gear 1 and the rotary shaft 4 may be denoted as a first-speed operating state of the gear shifting mechanism.

It can be understood that, in this embodiment of this application, the sliding apparatus 3 may be alternatively connected to the gear hub 2 by using a spline or the like, so that the sliding apparatus 3 can not only slide on the surface of the gear hub 2 in a direction toward or away from the gear 1, but also rotate synchronously with the gear hub 2.

In the foregoing embodiment, the differential rotation of the gear 1 and the rotary shaft 4 is described by using the rotation of the gear 1 and the rotary shaft 4 in the clockwise direction. In some other embodiments of this application, the differential rotation of the gear 1 and the rotary shaft 4 may be alternatively implemented when the gear 1 and the rotary shaft 4 rotate counterclockwise. For example, the gear 1 and the rotary shaft 4 may rotate counterclockwise, and the rotational speed $\omega 1$ of the gear 1 is less than the rotational speed $\omega 2$ of the rotary shaft 4.

Figure 5:
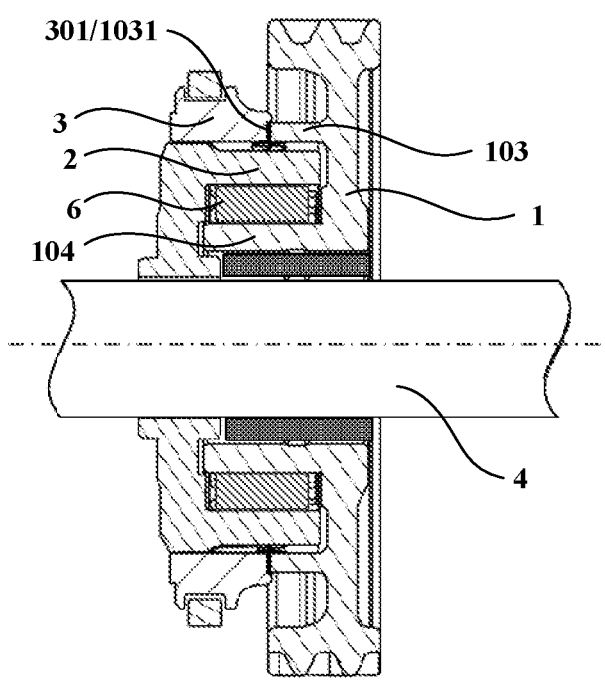
FIG. 5 is a cross-sectional view of a gear shifting mechanism according to another embodiment of this application.

In a gear shifting process of the gear shifting mechanism, a relative rotation relationship between the gear 1 and the rotary shaft 4 may change. In this application, the mechanism may implement gear shifting through a change of a location of the sliding apparatus 3. During specific implementation, the sliding apparatus 3 may slide from a location shown in FIG. 3 in a direction toward the gear 1, until the sliding apparatus 3 slides to a location shown in FIG. 5. FIG. 5 is a cross-sectional view showing that the second toothed structure 301 of the sliding apparatus 3 of the gear shifting mechanism and the first toothed structure 1031 of the first convex wall 103 of the gear 1 are in a meshed state according to an embodiment of this application.

In the embodiment shown in FIG. 5, the second toothed structure 301 of the sliding apparatus 3 and the first toothed structure 1031 of the first convex wall 103 of the gear 1 are in the meshed state, and the gear 1 and the rotary shaft 4 rotate in a direction that is the same as or opposite to a direction shown in FIG. 4. In this application, a synchronous rotation state of the gear 1 and the rotary shaft 4 may be denoted as a second-speed operating state of the gear shifting mechanism.

It can be understood that, with the gear shifting mechanism provided in this application, the one-way clutch 6 is disposed between the gear hub 2 and the second convex wall 104, and with respect to the gear hub 2, the second convex wall 104 is located on a side, of the one-way clutch 6, that is close to the rotary shaft 4. In this way, in a gear shifting process of the gear shifting mechanism, an acting force of the one-way clutch 6 is applied to the second convex wall 104 and the gear hub 2, to reduce impact of a change of an operating status of the one-way clutch 6 on stability of meshing between the gear 1 and another gear.

In addition, the second toothed structure 301 of the sliding apparatus 3 is stably meshed with the first toothed structure 1031 of the first convex wall 103, so that stability of power transmission can be maintained. This avoids interruption of power transmission between the gear 1 and the rotary shaft 4, thereby improving driving stability of an electric vehicle to which the gear shifting mechanism is applied.

When the one-way clutch 6 locks relative rotation between the gear 1 and the rotary shaft 4, the operating status of the one-way clutch 6 is likely to switch due to impact of power fluctuation (for example, in a vehicle bumping scenario). It can be learned from the descriptions of the foregoing embodiment that switching of the operating status of the one-way clutch 6 affects stability of power transmission of the gear shifting mechanism. Stability of the operating status of the one-way clutch 6 can be maintained through reliability of the meshing between the first toothed structure 1031 and the second toothed structure 301. In view of this, in some embodiments of this application, stable meshing between the first toothed structure 1031 and the second toothed structure 301 is implemented by designing a location locking structure of the sliding apparatus 3.

Figure 6:
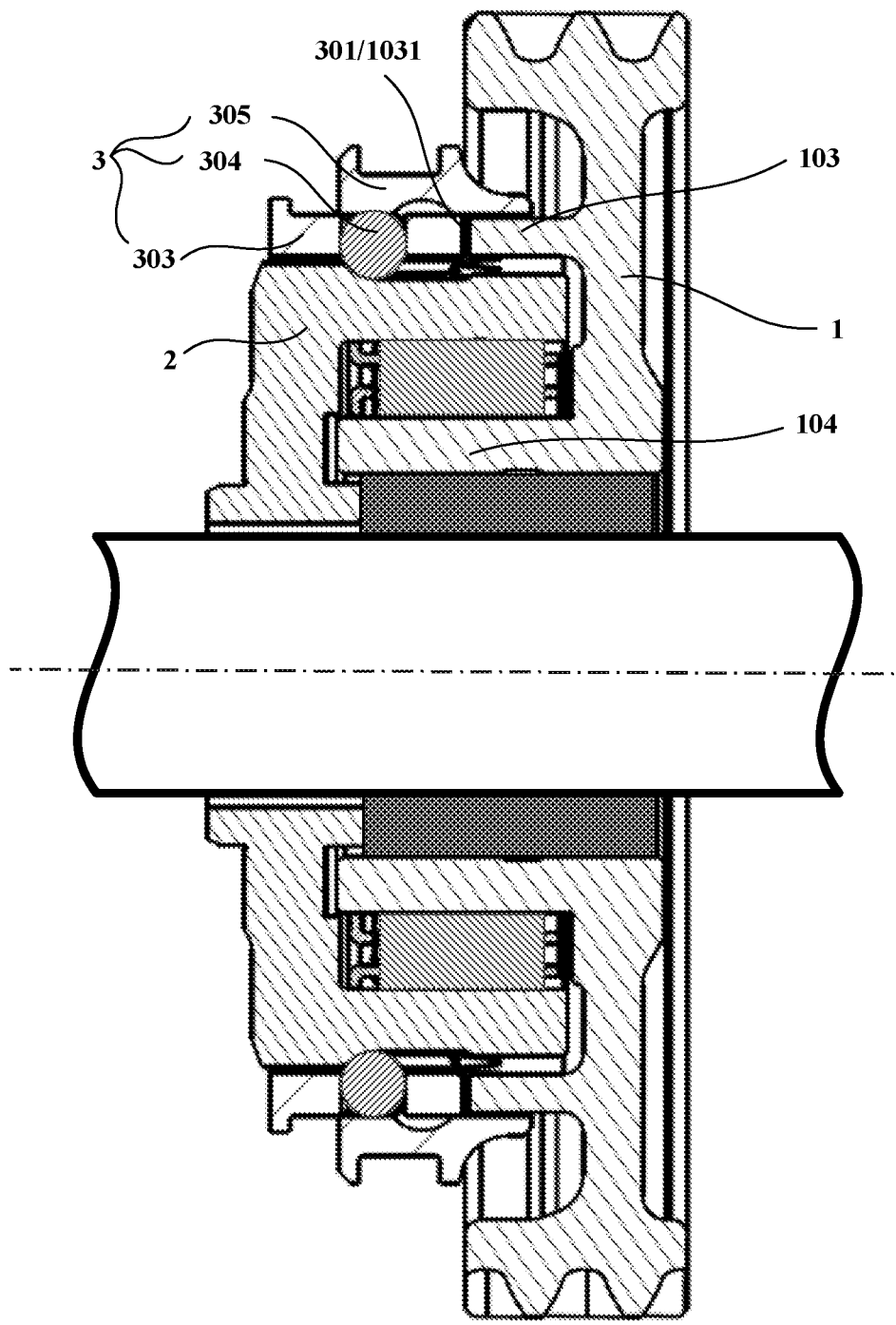
FIG. 6 is a cross-sectional view of a gear shifting mechanism according to another embodiment of this application.

During specific implementation, refer to FIG. 6. FIG. 6 is a cross-sectional view of a gear shifting mechanism according to another embodiment of this application. The gear shifting mechanism shown in FIG. 6 differs from that in the foregoing embodiment mainly in a manner of disposing the sliding apparatus 3. In this embodiment, the sliding apparatus 3 may include a supporting frame 303, a rolling component 304, and a sliding sleeve 305. The supporting frame 303 may have an annular structure. The supporting frame 303 is sleeved on the gear hub 2, and the supporting frame 303 may be radially fixed to the gear hub 2, so that the supporting frame 303 and the gear hub 2 can rotate synchronously. In addition, a second toothed structure 301 is disposed at an end of a side, of the supporting frame 303, that faces the first convex wall 103, and the second toothed structure 301 may be meshed with the first toothed structure 1031. In the embodiment shown in FIG. 6, the second toothed structure 301 and the first toothed structure 1031 are in a meshed state.

Figure 7:
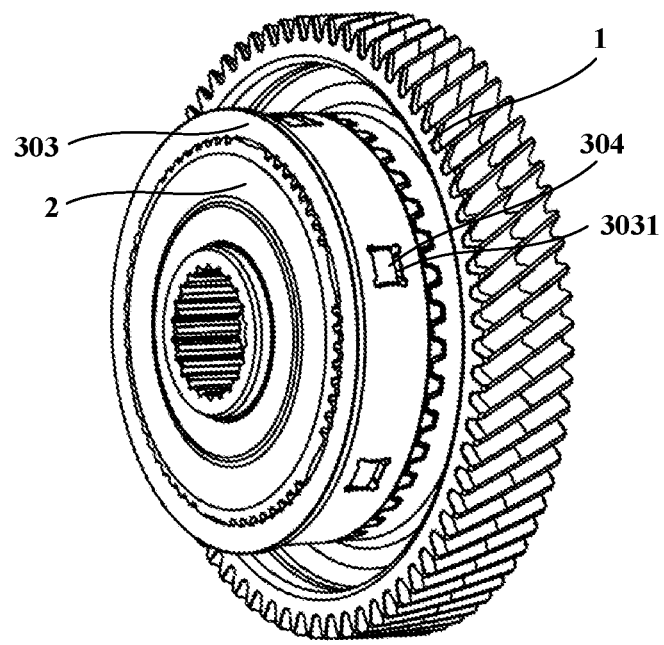
FIG. 7 is a schematic diagram of a structure of a gear shifting mechanism according to another embodiment of this application.

FIG. 7 shows a fitting relationship between the supporting frame 303, the gear hub 2, and the gear 1. The supporting frame 303 may be connected to the gear hub 2 by using a spline, but this does not constitute a limitation, so that the supporting frame 303 can not only slide on the surface of the gear hub 2 in a direction toward or away from the gear 1, but also rotate along with the gear hub 2. In addition, the supporting frame 303 is disposed with a mounting slot 3031. The rolling component 304 is mounted in the mounting slot 3031, the rolling component 304 is in contact with the surface of the gear hub 2, and the rolling component 304 is capable of rolling in the mounting slot 3031. In a possible embodiment of this application, the rolling component 304 may be a pin roller, and the mounting slot 3031 may be provided as a rectangular slot, so that the rolling component 304 can be confined in the mounting slot 3031. In this embodiment, the rolling component 304 is disposed as a pin roller, so that a contact area between the rolling component 304 and the gear hub 2 can be effectively increased, to improve stability for supporting the rolling component 304 by the gear hub 2. In some other possible embodiments of this application, the rolling component 304 may be alternatively disposed as a ball.

Figure 8:
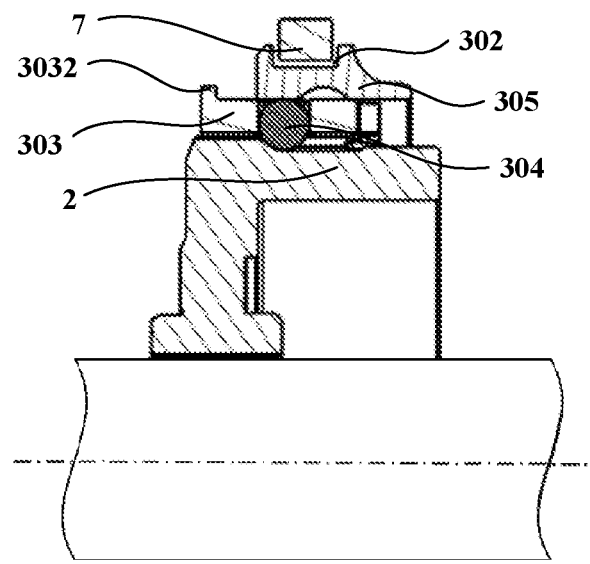
FIG. 8 is a cross-sectional view of a gear shifting mechanism according to another embodiment of this application.

The sliding sleeve 305 may be configured to drive the supporting frame 303 and the rolling component 304 to slide on the surface of the gear hub 2 in a direction toward or away from the first toothed structure 1031. For ease of describing a fitting relationship between the sliding sleeve 305, the supporting frame 303, and the rolling component 304, refer to FIG. 8. FIG. 8 is a schematic diagram of the fitting relationship between the sliding sleeve 305, the supporting frame 303, and the rolling component 304 in the gear shifting mechanism in the embodiment shown in FIG. 6. It can be learned from FIG. 8 that the sliding sleeve 305 may be sleeved on the supporting frame 303, and the rolling component 304 may be confined between the sliding sleeve 305 and the gear hub 2. In addition, a groove 302 may be disposed on a surface, of the sliding sleeve 305, that is away from the gear hub 2, and a shifting fork 7 may snap into the groove 302, to implement connection between the shifting fork 7 and the sliding sleeve 305. In this way, the sliding sleeve 305 is driven, through an operation on the shifting fork 7, to slide, and a meshed or detached state of the second toothed structure 301 of the supporting frame 303 and the first toothed structure 1031 of the first convex wall 103 of the gear 1 is controlled.

To enable the sliding sleeve 305 to drive the supporting frame 303 to slide in a direction away from the first toothed structure 1031, a should 3032 may be disposed at an end, of the supporting frame 303, that is away from the first convex wall 103. The should 3032 is disposed on a surface of a side, of the supporting frame 303, that is away from the gear hub 2. Refer to both FIG. 6 and FIG. 8. The sliding sleeve 305 is disposed on a side, of the should 3032, that faces the gear 1, and the sliding sleeve 305 may abut against the should 3032, to effectively prevent the sliding sleeve 305 from being detached from the supporting frame 303.

Figure 9:
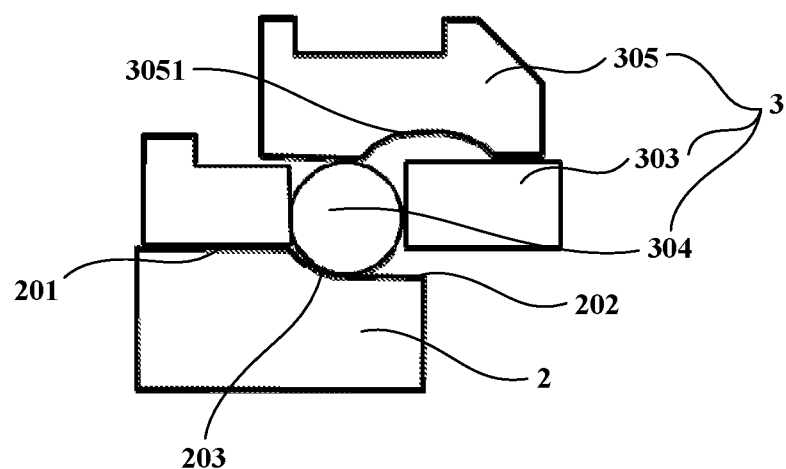
FIG. 9 is a schematic diagram of a structure of fitting between a sliding apparatus and a gear hub according to an embodiment of this application.

FIG. 9 is a schematic diagram of a structure of fitting between the sliding apparatus 3 and the gear hub 2 according to an embodiment of this application. A surface, of the gear hub 2, that is used to fit the sliding apparatus 3 may be alternatively provided as a stepped surface. In this embodiment of this application, a stepped surface, of the gear hub 2, that has a larger outer diameter may be referred to as a first stepped surface 201, and a stepped surface with a smaller outer diameter is referred to as a second stepped surface 202. In this case, the first stepped surface 201 is located on a side, of the second stepped surface 202, that is away from the rotary shaft. In addition, the first stepped surface 201 and the second stepped surface 202 may be connected by using an arc connection surface 203.

A location of the sliding apparatus 3 shown in FIG. 9 is the same as that of the sliding apparatus 3 shown in FIG. 6. Therefore, it can be understood that, in the embodiment shown in FIG. 9, the second toothed structure 301 of the supporting frame 303 and the first toothed structure 1031 of the first convex wall 103 are in a meshed state. In this state, the rolling component 304 is separately tangent to the second stepped surface 202 of the gear hub 2 and an inner surface of the sliding sleeve 305. It can be understood that, in this embodiment, a diameter of the rolling component 304 is greater than a wall thickness of the supporting frame 303. In this case, if a connection between the first toothed structure 1031 of the first convex wall 103 and the second toothed structure 301 of the supporting frame 303 appears to be loose, the rolling component 304 may move back, within a small range, to the arc connection surface 203 between the first stepped surface 201 and the second stepped surface 202 of the gear hub 2. However, because the rolling component 304 is tangent to the inner surface of the sliding sleeve 305 in this case, the rolling component 304 is confined by the sliding sleeve 305 and the second stepped surface 202 of the gear hub 2, and no longer moves in a direction toward the first stepped surface 201. In this way, the first convex wall 103 and the supporting frame 303 can be locked in a connected state shown in FIG. 10.

Figure 10:
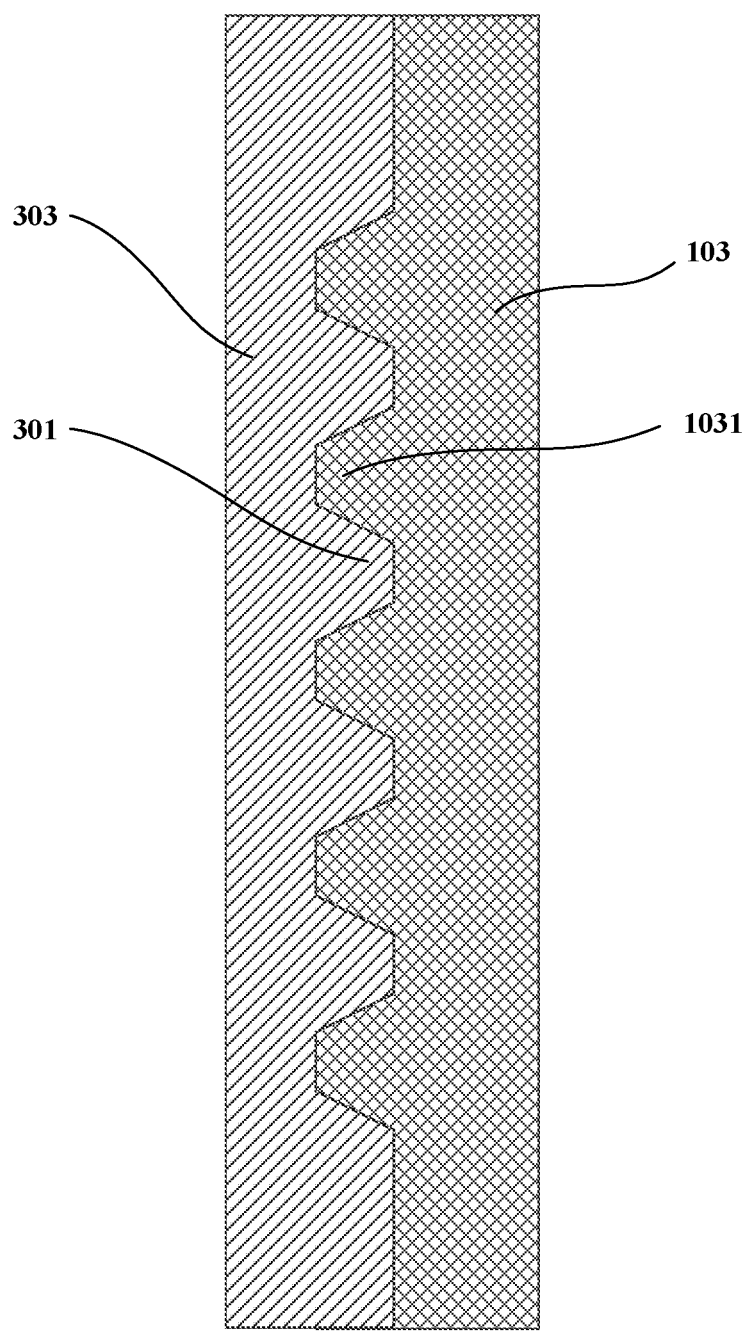
FIG. 10 is a schematic diagram of a meshed state of a second toothed structure and a first toothed structure according to an embodiment of this application.

FIG. 10 is a schematic diagram of a structure when the second toothed structure 301 of the supporting frame 303 and the first toothed structure 1031 of the first convex wall 103 are in a meshed state. In some embodiments of this application, teeth of the first toothed structure 1031 and teeth of the second toothed structure 301 may be both arranged in trapezoidal structures, but this does not constitute a limitation. A cross-sectional area at the top of the trapezoidal structure is less than that at the root. The root of the trapezoidal structure is an end, of the trapezoidal structure, that is used to connect to a corresponding first convex wall or sliding sleeve. In this case, the top of the trapezoidal structure is an end, of the trapezoidal structure, that is away from the corresponding first convex wall or sliding sleeve. The teeth of the first toothed structure 1031 and the teeth of the second toothed structure 301 are arranged in the trapezoidal structures, so that the first toothed structure 1031 can be conveniently meshed with the second toothed structure 301.

In addition, it can be learned from the descriptions of the foregoing embodiment that, when the second toothed structure 301 of the supporting frame 303 and the first toothed structure 1031 of the first convex wall 103 are in the meshed state, the gear shifting mechanism is in the second-speed operating state. In this case, the gear 1 and the rotary shaft 4 shown in FIG. 6 can rotate synchronously. In addition, because relative locations of the first convex wall 103 and the supporting frame 303 can be locked in the meshed state, the gear 1 and the rotary shaft 4 can be prevented from being detached from each other in a power transmission process, so that stability of power transmission between the gear 1 and the rotary shaft 4 can be improved.

Still refer to FIG. 9. In this application, an arc surface 3051 may be further disposed on the inner surface of the sliding sleeve 305. In a process in which the sliding sleeve 305 slides from a location shown in FIG. 9 in a direction away from the first convex wall 103 (not shown in FIG. 9, where reference may be made to FIG. 6), the sliding sleeve 305 abuts against the should 3032 of the supporting frame 303, and the rolling component 304 can be tangent to the arc surface 3051 of the sliding sleeve 305. Therefore, the sliding sleeve 305 can drive the rolling component 304 to move from the second stepped surface 202 of the gear hub 2 in a direction from the arc connection surface 203 to the first stepped surface 201.

Figure 11:
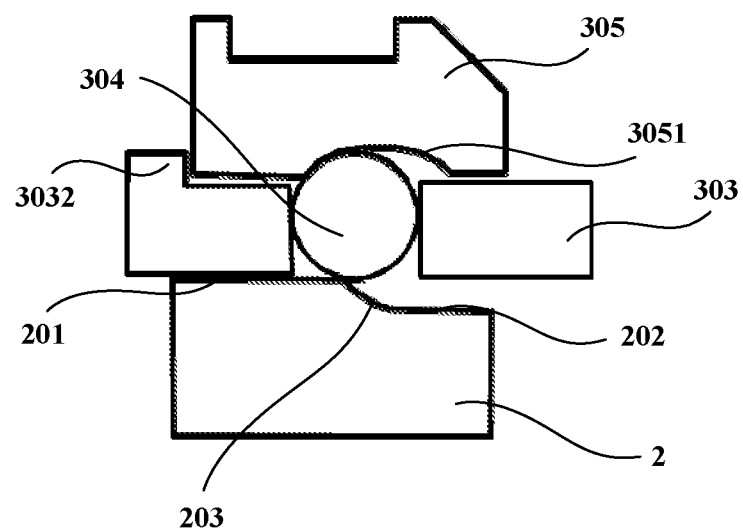
FIG. 11 is a schematic diagram of a structure of fitting between a sliding apparatus and a gear hub according to another embodiment of this application.
Figure 12:
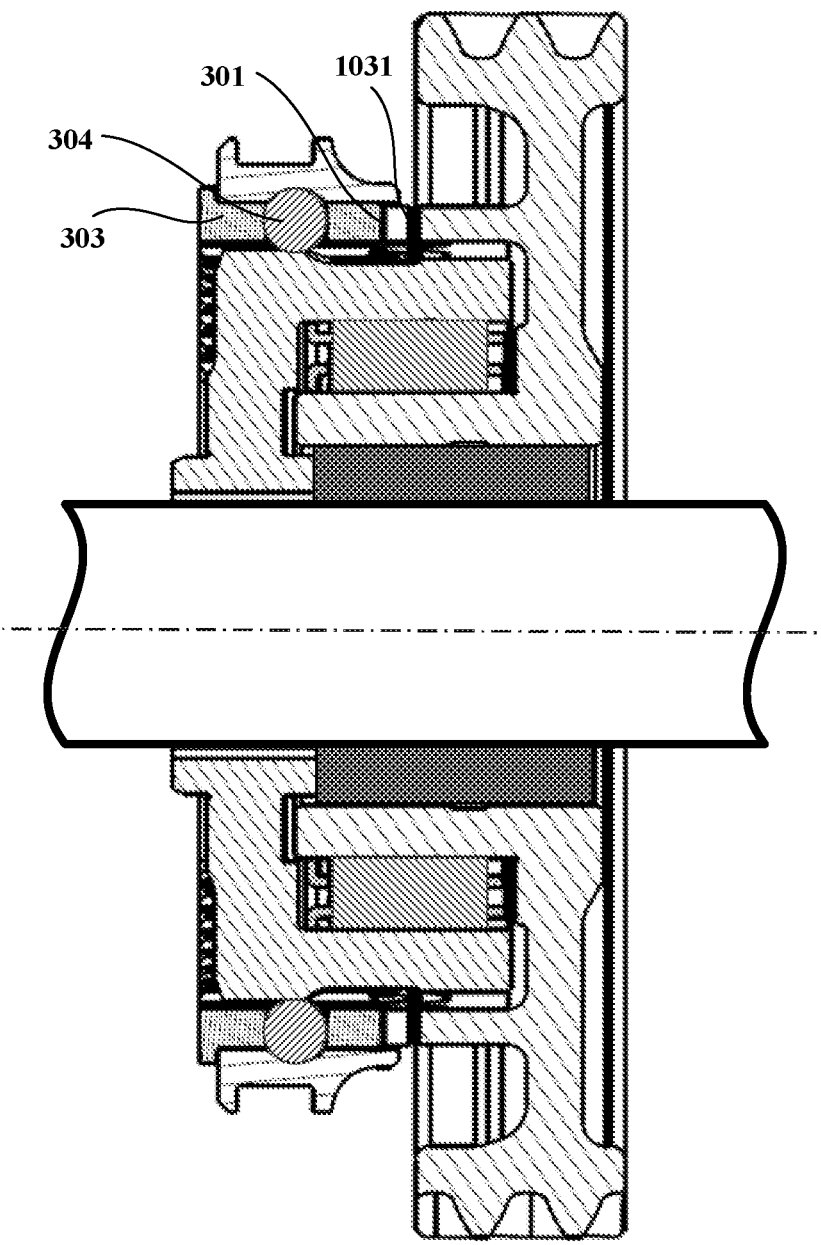
FIG. 12 is a cross-sectional view of a gear shifting mechanism according to another embodiment of this application.

FIG. 11 is a schematic diagram of a structure when the rolling component 304 is tangent to both the first stepped surface 201 of the gear hub 2 and the arc surface 3051 of the sliding sleeve 305. In this case, to enable the sliding sleeve 305 to continue sliding in the direction away from the first convex wall 103, the second toothed structure 301 of the supporting frame 303 and the first toothed structure 1031 of the first convex wall 103 may be in a detached state shown in FIG. 12. It can be learned from the descriptions of the foregoing embodiment that, when the second toothed structure 301 of the supporting frame 303 and the first toothed structure 1031 of the first convex wall 103 are in the detached state, the gear shifting mechanism is in the first-speed operating state. In this case, the gear 1 and the rotary shaft 6 can rotate independently, to implement differential rotation of the gear 1 and the rotary shaft 6.

In the foregoing embodiment, the gear shifting process of switching the gear shifting mechanism from the second-speed operating state to the first-speed operating state is described. On this basis, when the gear shifting mechanism needs to be switched from the first-speed operating state shown in FIG. 12 to the second-speed operating state shown in FIG. 6, the sliding sleeve 305 may be enabled to slide in a direction toward the first convex wall 103, so that the second toothed structure 301 of the supporting frame 303 is meshed with the first toothed structure 1031 of the first convex wall 103. In this case, refer to FIG. 6. The rolling component 304 moves to the second stepped surface 202 of the gear hub 2, and is tangent to both the second stepped surface 202 and the inner surface of the sliding sleeve 305, so that the sliding apparatus 3 is locked at the location, to implement stable meshing between the second toothed structure 301 of the supporting frame 303 and the first toothed structure 1031 of the first convex wall 103.

With the gear shifting mechanism provided in this embodiment of this application, the sliding apparatus 3 is disposed as a structure in which the sliding sleeve 305, the supporting frame 303, and the rolling component 304 cooperate with each other, and the stepped surfaces are disposed on the surface of the gear hub 2. Therefore, when the second toothed structure 301 of the supporting frame 303 is meshed with the first toothed structure 1031 of the first convex wall 103, the rolling component 304 can be confined by the sliding sleeve 305 and the gear hub 2, to lock a location of the supporting frame 303, and implement reliable meshing between the second toothed structure 301 and the first toothed structure 1031. Therefore, the gear 1 and the rotary shaft 4 can be prevented from being detached from each other in a power transmission process, to avoid interruption of power transmission between the gear 1 and the rotary shaft 4, thereby improving driving stability of an electric vehicle to which the gear shifting mechanism is applied.

In addition, with the gear shifting mechanism, because the one-way clutch 6 is disposed between the gear hub 2 and the second convex wall 104, stability of meshing between the gear 1 and another gear can be maintained.

It can be understood that, in addition to the two-speed gear shifting scenario, the gear shifting mechanism provided in the foregoing embodiment of this application may be further applied to a scenario with a gear shifting requirement for more than two speeds. During specific implementation, a plurality of gear shifting mechanisms provided in this application may be disposed, and gear faces of gears of the gear shifting mechanisms may have different quantities of teeth. In this way, a transmission ratio may be changed through meshing between gear faces of gears with different quantities of teeth, to meet a multi-speed adjustment requirement.

In addition, when the gear shifting mechanism provided in this application is applied to a gearbox, efficiency of a powertrain using the gearbox can be improved, thereby extending a driving mileage. In this way, when a total driving mileage of an electric vehicle remains unchanged, battery usage can be reduced, to reduce costs. This has great economic value.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A gear shifting mechanism, comprising a gear, a gear hub, a one-way clutch, and a sliding apparatus, wherein:
   the gear comprises a body, a first convex wall and a second convex wall, each of the first convex wall and the second convex wall are disposed on an end face of the body, the first convex wall is disposed around a shaft hole of the body, a first toothed structure is disposed at an end of the first convex wall that is away from the body, the second convex wall and the first convex wall are disposed on a same side of the body, the second convex wall is disposed around the shaft hole of the body, a diameter of the second convex wall is less than that of the first convex wall, the gear hub is sleeved on the second convex wall, the one-way clutch is disposed between the gear hub and the second convex wall, an inner ring of the one-way clutch is connected to the second convex wall, and an outer ring of the one-way clutch is connected to the gear hub;
   the sliding apparatus comprises a supporting frame, a rolling component, and a sliding sleeve, the supporting frame is sleeved on the gear hub, the supporting frame is radially fixed to the gear hub, a second toothed structure is disposed at an end of the supporting frame that faces the first convex wall, the supporting frame is disposed with a mounting slot, the rolling component is mounted in the mounting slot, the rolling component is in contact with a surface of the gear hub, the sliding sleeve is sleeved on the supporting frame, the rolling component is confined between the sliding sleeve and the gear hub, and the sliding sleeve is capable of driving the supporting frame and the rolling component to slide on the surface of the gear hub in a direction toward or away from the gear; and
   when the second toothed structure is meshed with the first toothed structure, the gear and a rotary shaft rotate synchronously; or when the second toothed structure is detached from the first toothed structure, the gear and the rotary shaft rotate synchronously or differentially.

2. The gear shifting mechanism according to claim 1, wherein the gear shifting mechanism further comprises the rotary shaft, the rotary shaft penetrates the shaft hole of the body, and the gear hub is fixedly connected to the rotary shaft.

3. The gear shifting mechanism according to claim 1, wherein the gear is sleeved on the rotary shaft by using a bearing.

4. The gear shifting mechanism according to claim 1, wherein a first stepped surface, a second stepped surface, and an arc connection surface used to connect the first stepped surface and the second stepped surface are disposed on a surface of the gear hub that is used to fit the sliding apparatus, and the first stepped surface is located on a side of the second stepped surface that is away from the rotary shaft; and
   wherein a diameter of the rolling component is greater than a wall thickness of the supporting frame, and when the second toothed structure is meshed with the first toothed structure, the rolling component is tangent to the second stepped surface and an inner surface of the sliding sleeve.

5. The gear shifting mechanism according to claim 4, wherein an arc surface is disposed on the inner surface of the sliding sleeve, and when the second toothed structure is detached from the first toothed structure, the rolling component is tangent to the first stepped surface and the arc surface.

6. The gear shifting mechanism according to claim 1, wherein the rolling component is a pin roller, the mounting slot is a rectangular slot, and the pin roller is confined in the rectangular slot.

7. The gear shifting mechanism according to claim 1, wherein a shoulder is disposed at an end of the supporting frame that is away from the first convex wall, the sliding sleeve is disposed on a side of the shoulder, that faces the gear, and the sliding sleeve may abut against the shoulder.

8. The gear shifting mechanism according to claim 1, wherein the gear shifting mechanism further comprises a shifting fork, a groove is disposed on a surface of the sliding sleeve that is away from the gear hub, the shifting fork snaps into the groove, and the shifting fork is configured to drive the sliding sleeve to slide on the surface of the gear hub in a direction toward or away from the gear.

9. The gear shifting mechanism according to claim 1, wherein teeth of the first toothed structure and teeth of the second toothed structure are both arranged in trapezoidal structures.

10. A gearbox, comprising a gear shifting mechanism, wherein the gear shifting mechanism comprises a gear, a gear hub, a one-way clutch, and a sliding apparatus, wherein:
    the gear comprises a body, a first convex wall, and a second convex wall, each of the first convex wall and the second convex wall are disposed on an end face of the body, the first convex wall is disposed around a shaft hole of the body, a first toothed structure is disposed at an end of the first convex wall that is away from the body, the second convex wall and the first convex wall are disposed on a same side of the body, the second convex wall is disposed around the shaft hole of the body, a diameter of the second convex wall is less than that of the first convex wall, the gear hub is sleeved on the second convex wall, the one-way clutch is disposed between the gear hub and the second convex wall, an inner ring of the one-way clutch is connected to the second convex wall, and an outer ring of the one-way clutch is connected to the gear hub;

the sliding apparatus comprises a supporting frame, a rolling component, and a sliding sleeve, the supporting frame is sleeved on the gear hub, the supporting frame is radially fixed to the gear hub, a second toothed structure is disposed at an end of the supporting frame that faces the first convex wall, the supporting frame is disposed with a mounting slot, the rolling component is mounted in the mounting slot, the rolling component is in contact with a surface of the gear hub, the sliding sleeve is sleeved on the supporting frame, the rolling component is confined between the sliding sleeve and the gear hub, and the sliding sleeve is capable of driving the supporting frame and the rolling component to slide on the surface of the gear hub in a direction toward or away from the gear; and when the second toothed structure is meshed with the first toothed structure, the gear and a rotary shaft rotate synchronously; or when the second toothed structure is detached from the first toothed structure, the gear and the rotary shaft rotate synchronously or differentially; and wherein the gear is meshed with another gear in the gearbox.

11. The gearbox according to claim 10, wherein the gear shifting mechanism further comprises the rotary shaft, the rotary shaft penetrates the shaft hole of the body, and the gear hub is fixedly connected to the rotary shaft.

12. The gearbox according to claim 10, wherein the gear is sleeved on the rotary shaft by using a bearing.

13. A powertrain, comprising a motor and a gearbox, wherein the gearbox comprises a gear shifting mechanism, wherein the gear shifting mechanism comprises a gear, a gear hub, a one-way clutch, and a sliding apparatus, wherein:

the gear comprises a body, a first convex wall, and a second convex wall, each of the first convex wall and the second convex wall are disposed on an end face of the body, the first convex wall is disposed around a shaft hole of the body, a first toothed structure is disposed at an end of the first convex wall that is away from the body, the second convex wall and the first convex wall are disposed on a same side of the body, the second convex wall is disposed around the shaft hole of the body, a diameter of the second convex wall is less than that of the first convex wall, the gear hub is sleeved on the second convex wall, the one-way clutch is disposed between the gear hub and the second convex wall, an inner ring of the one-way clutch is connected to the second convex wall, and an outer ring of the one-way clutch is connected to the gear hub;

the sliding apparatus comprises a supporting frame, a rolling component, and a sliding sleeve, the supporting frame is sleeved on the gear hub, the supporting frame is radially fixed to the gear hub, a second toothed structure is disposed at an end of the supporting frame that faces the first convex wall, the supporting frame is disposed with a mounting slot, the rolling component is mounted in the mounting slot, the rolling component is in contact with a surface of the gear hub, the sliding sleeve is sleeved on the supporting frame, the rolling component is confined between the sliding sleeve and the gear hub, and the sliding sleeve is capable of driving the supporting frame and the rolling component to slide on the surface of the gear hub in a direction toward or away from the gear;

when the second toothed structure is meshed with the first toothed structure, the gear and a rotary shaft rotate synchronously; or when the second toothed structure is detached from the first toothed structure, the gear and the rotary shaft rotate synchronously or differentially;

wherein the gear is meshed with another gear in the gearbox; and wherein a power output by the motor is transmitted to the gearbox through the gear shifting mechanism.

* * * * *